United States Patent [19]
Joseph

[11] Patent Number: 5,289,100
[45] Date of Patent: Feb. 22, 1994

[54] SYSTEM FOR POWERING, SPEED CONTROL, STEERING, AND BRAKING

[76] Inventor: Craig L. Joseph, 18500 Morrill Mill Rd., Los Gatos, Calif. 95030

[21] Appl. No.: 929,643

[22] Filed: Aug. 12, 1992

Related U.S. Application Data

[62] Division of Ser. No. 602,839, Oct. 24, 1990, Pat. No. 5,162,707.

[51] Int. Cl.$^5$ .............................................. H02P 7/00
[52] U.S. Cl. ................................................... 318/799
[58] Field of Search ..................... 318/67, 69, 77, 78, 318/60, 52, 55, 811, 727, 83, 56, 799-810, 812; 388/819, 823; 290/11, 17, 40 R, 40 B, 46; 180/170, 178

[56] References Cited

U.S. PATENT DOCUMENTS

| | | | |
|---|---|---|---|
| 3,760,246 | 9/1973 | Gurwicz et al. | 318/52 |
| 4,471,273 | 9/1984 | Melocik et al. | 318/55 |
| 4,495,449 | 1/1985 | Black et al. | 318/83 X |
| 4,511,825 | 4/1985 | Klimo | 318/77 X |
| 4,513,231 | 4/1985 | Kuno et al. | 388/819 |
| 4,605,885 | 8/1986 | Mitsuhashi | 388/819 |
| 4,906,906 | 3/1990 | Lautzenhiser | 318/60 X |
| 5,027,048 | 6/1991 | Masrur et al. | 318/799 X |

*Primary Examiner*—Jonathan Wysocki
*Attorney, Agent, or Firm*—Michael Lee; R. C. Kamp; R. B. Megley

[57] ABSTRACT

A propulsion system for using a pair of electric induction motors to power a pair of vehicle drive wheels. The motors are driven by pulses of electric current from a common dc bus. The inductance of stator windings cause electric current to power the motors during the time between pulses so power from the dc bus is low. When a vehicle is making a tight turn, an inside motor provides an electric current to the dc bus to supply additional power to an outside motor. Speed and steering signals operate the electric motors and control speed of an engine and an alternator which supply power to the dc bus.

1 Claim, 10 Drawing Sheets

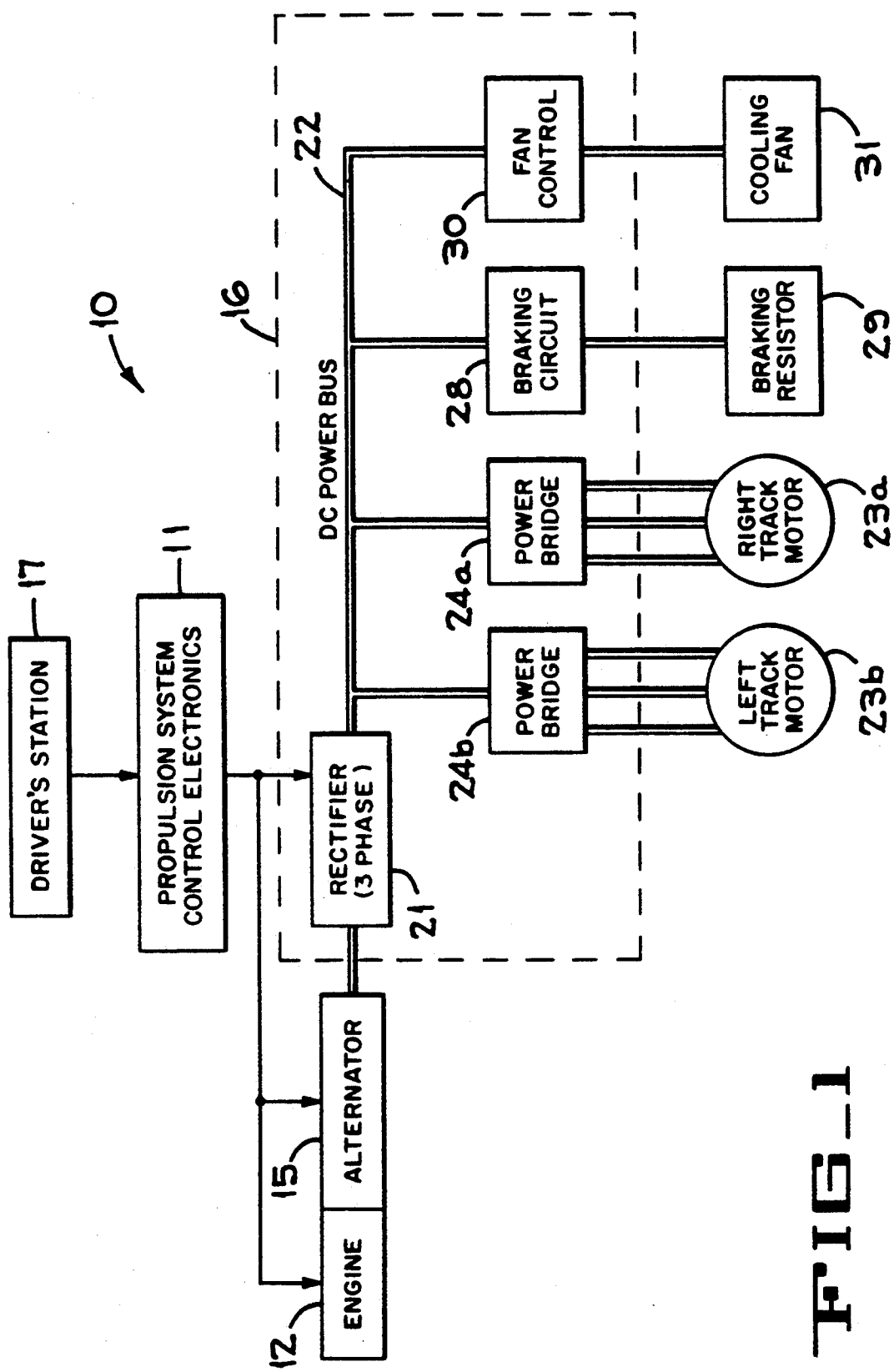
FIG_1

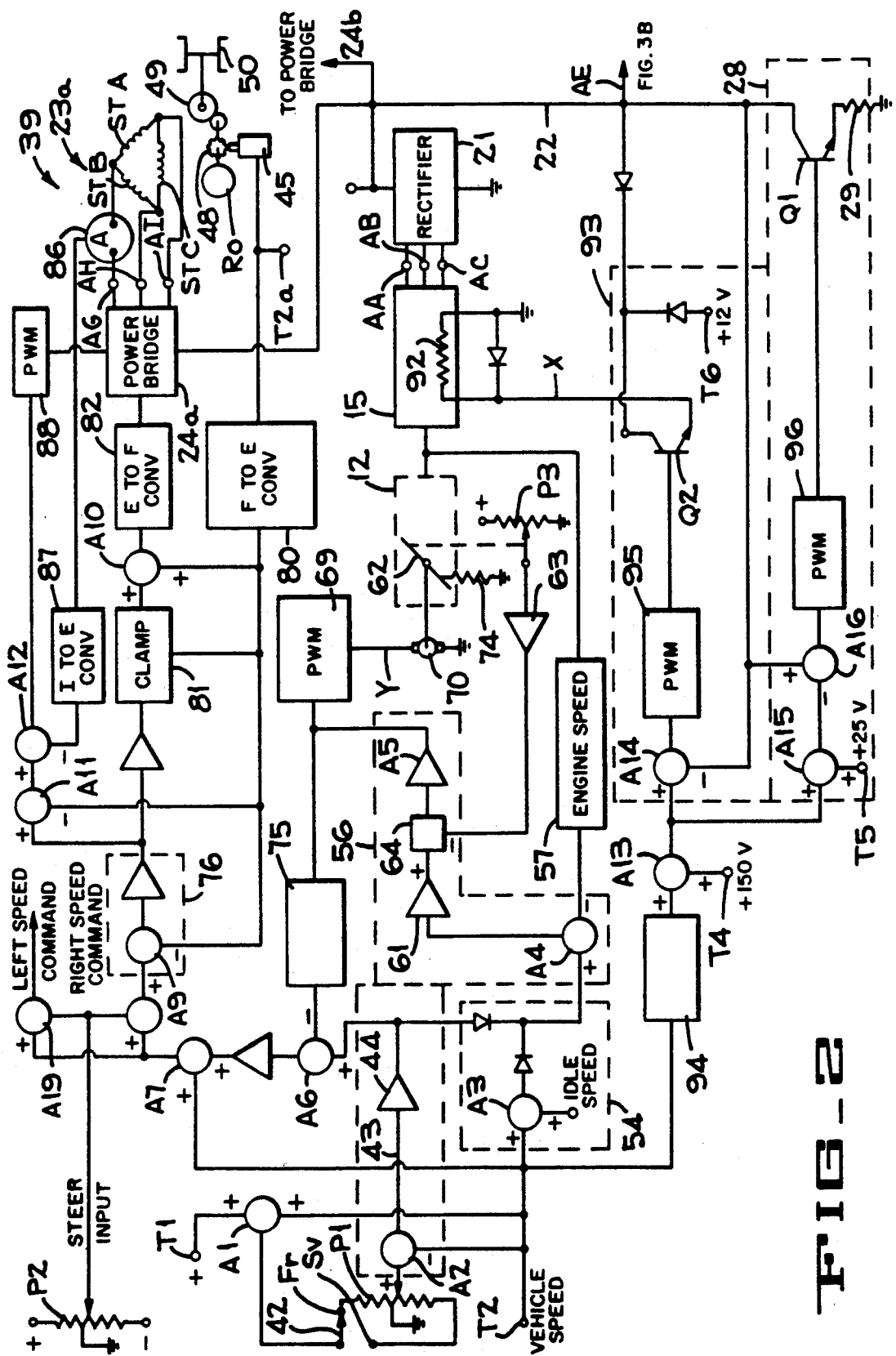
FIG_2

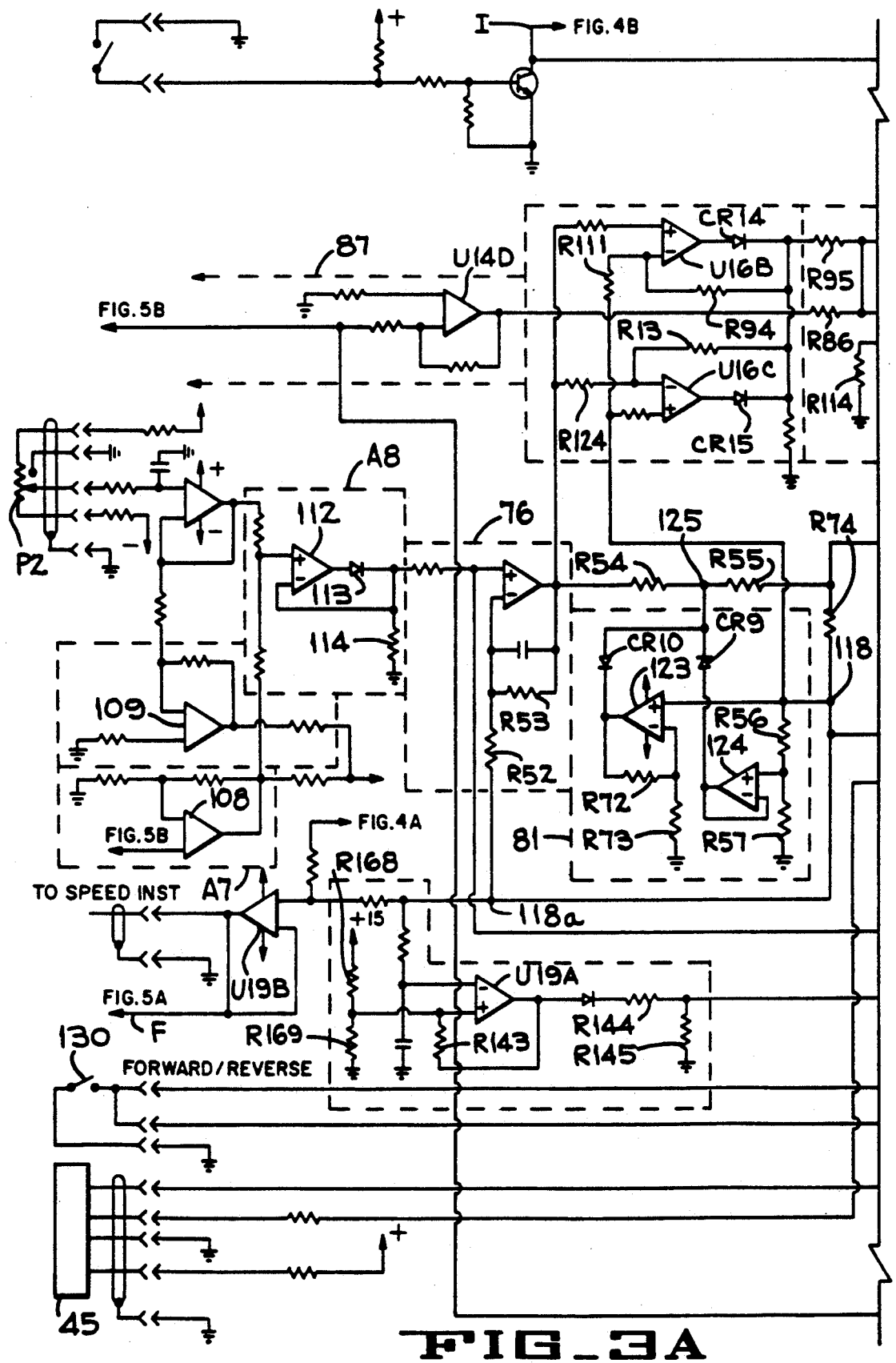
FIG_3A

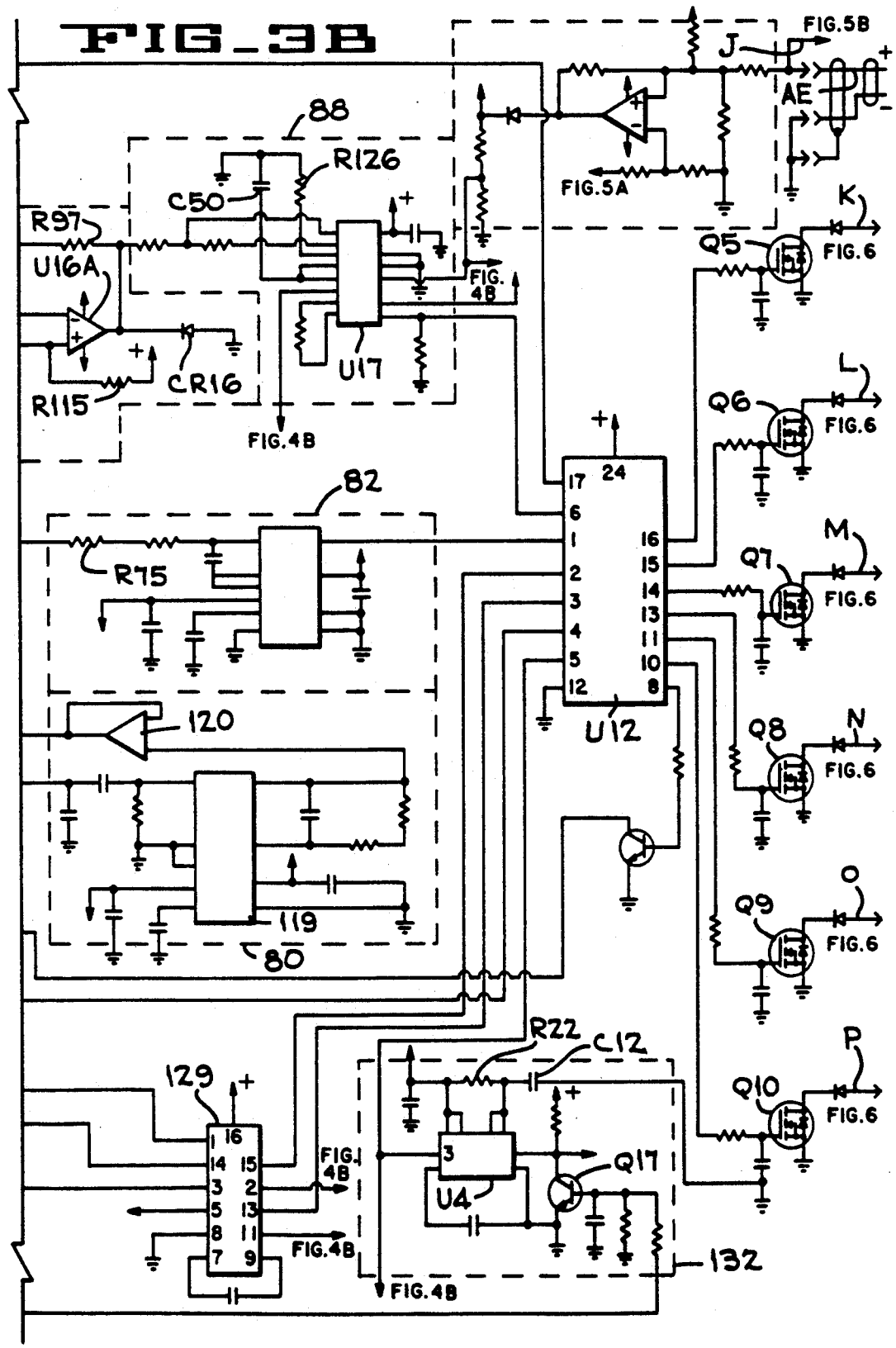

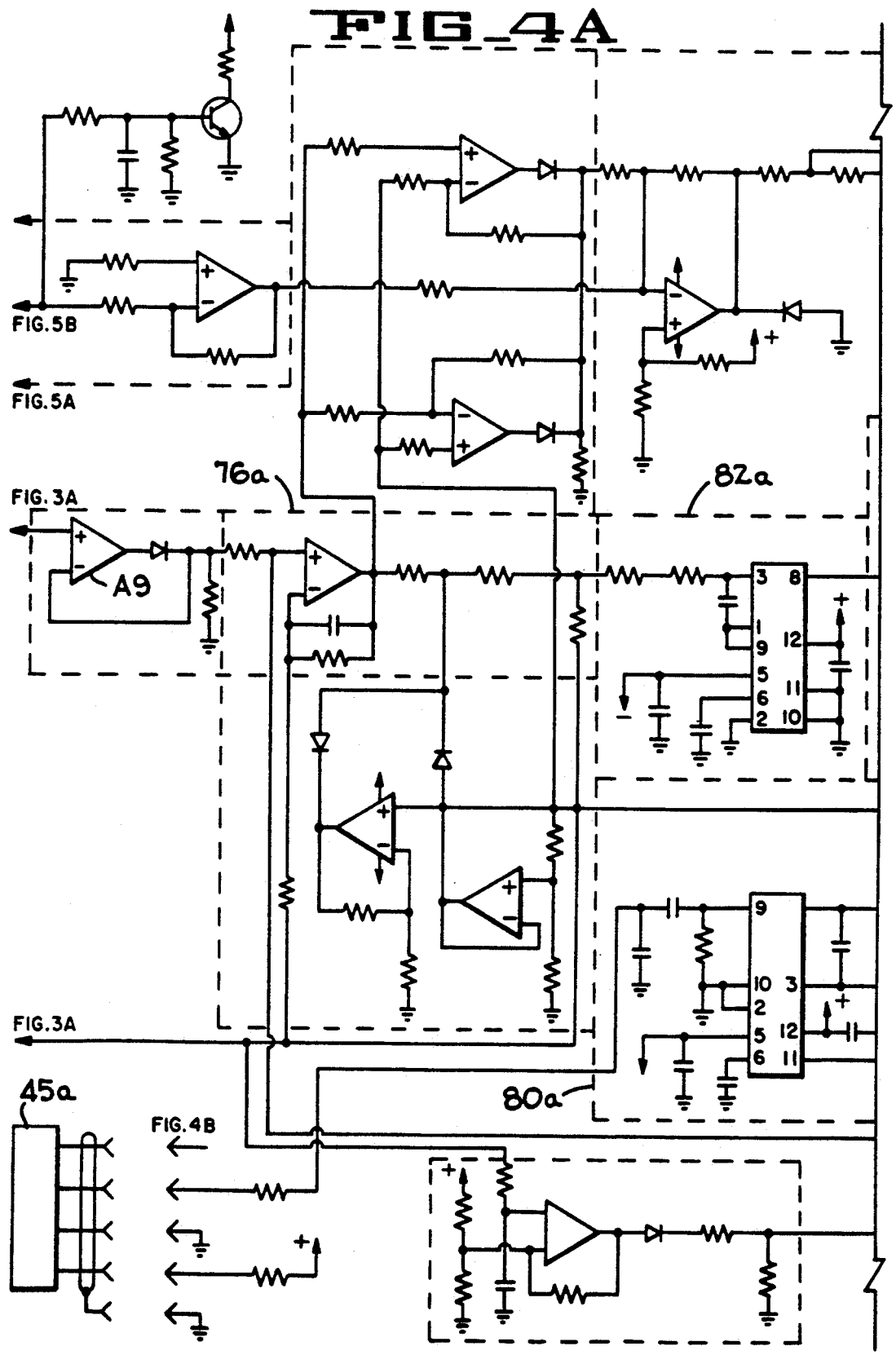

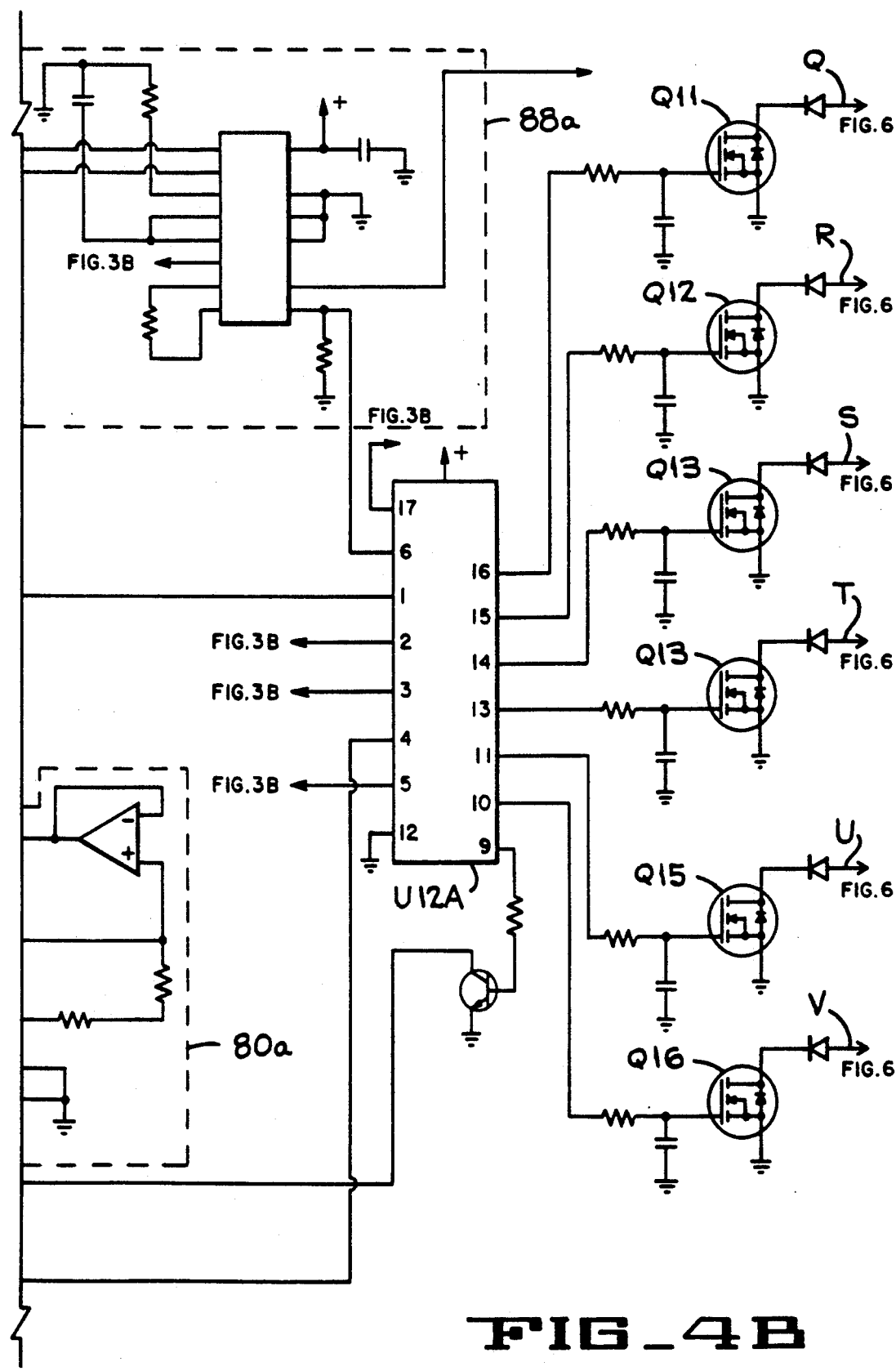
FIG_4B

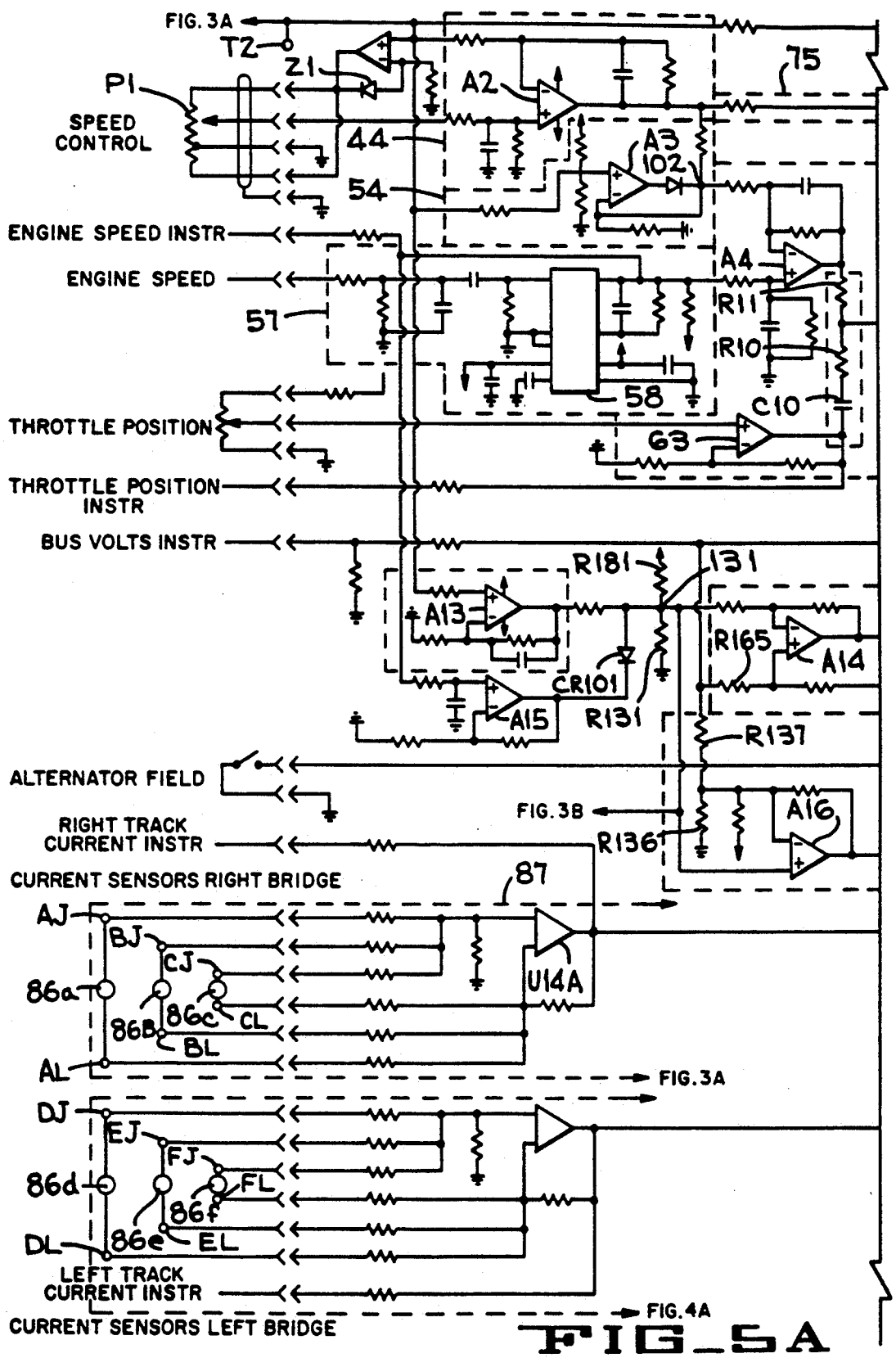

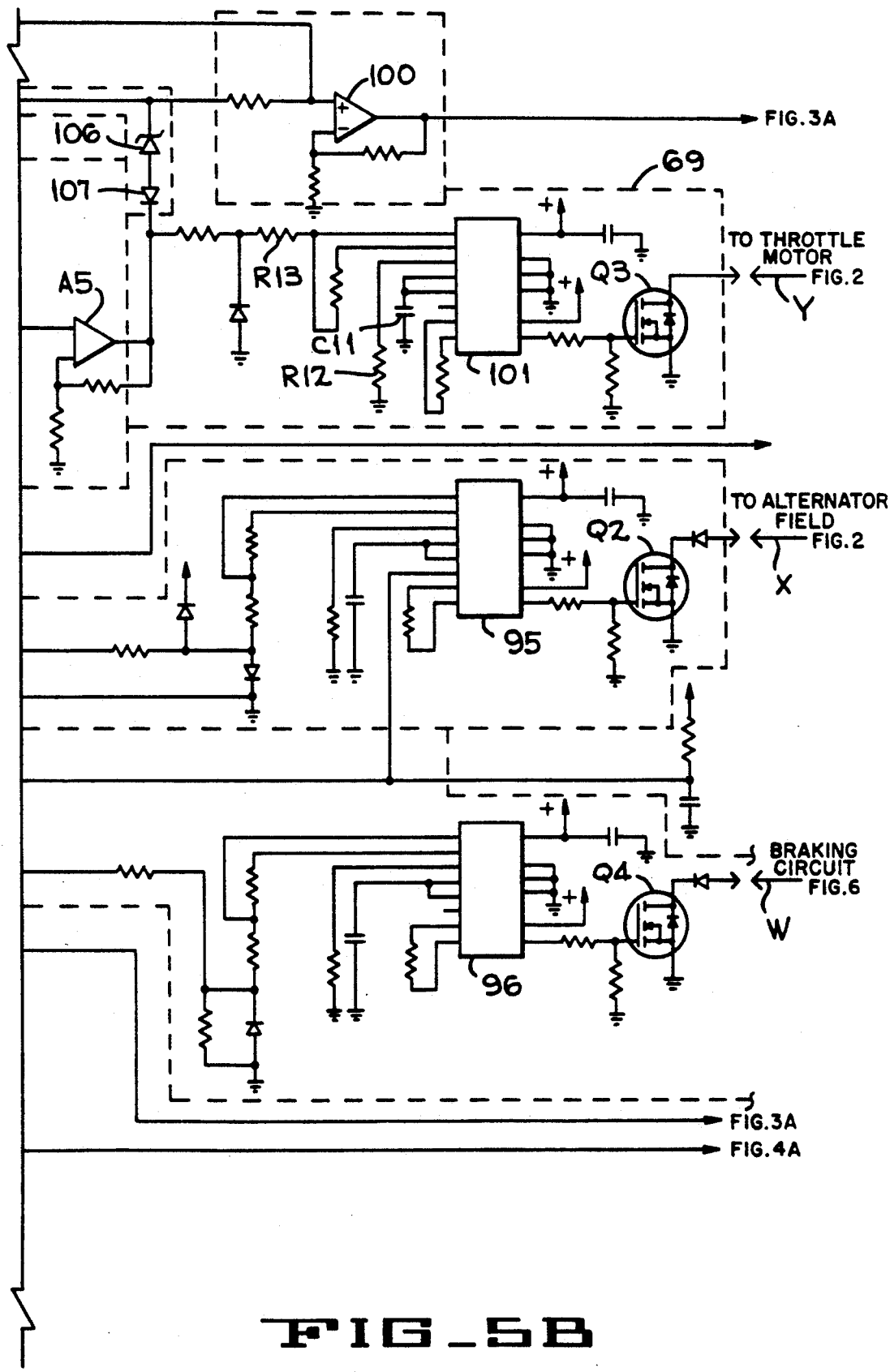
FIG_5B

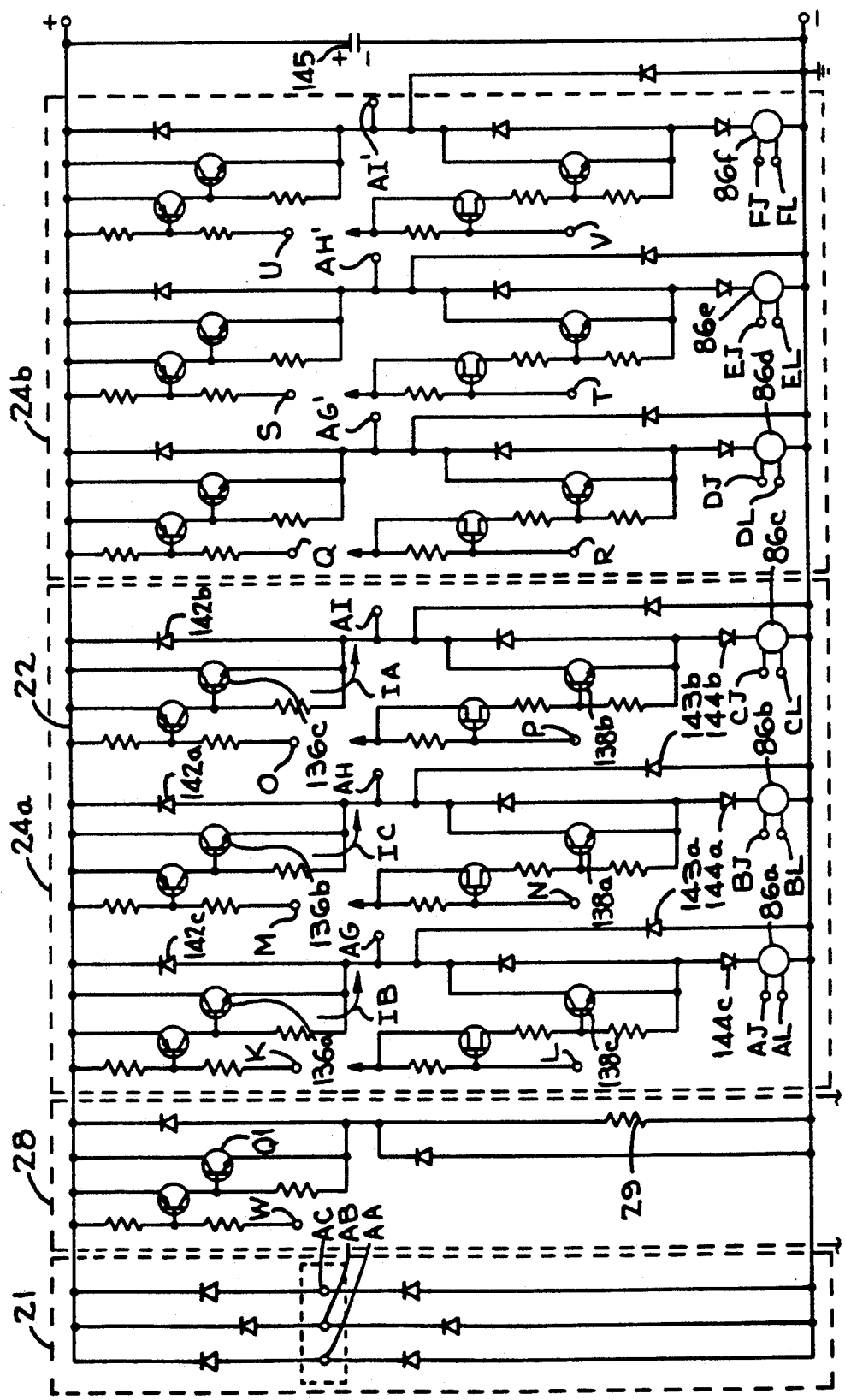
FIG_6

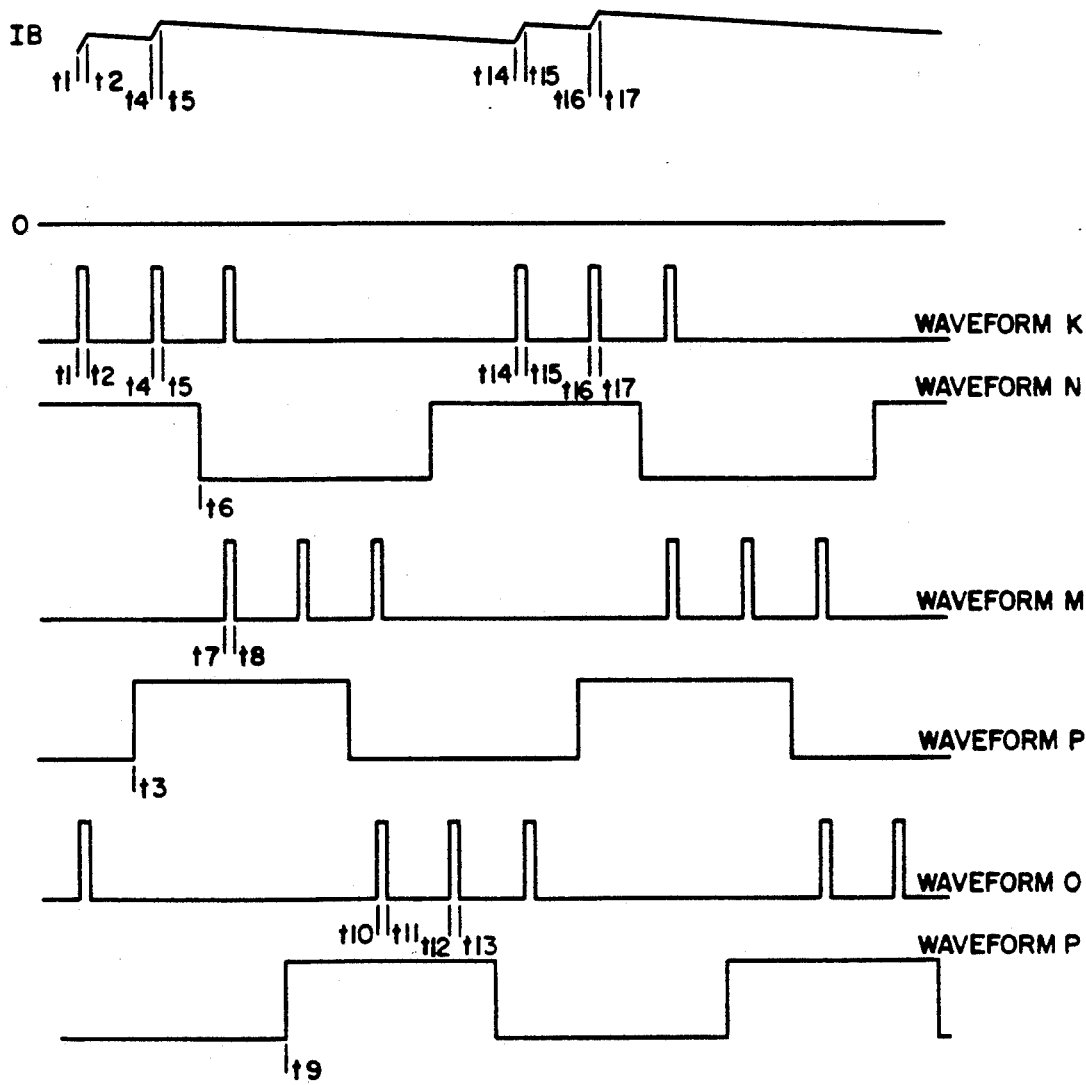
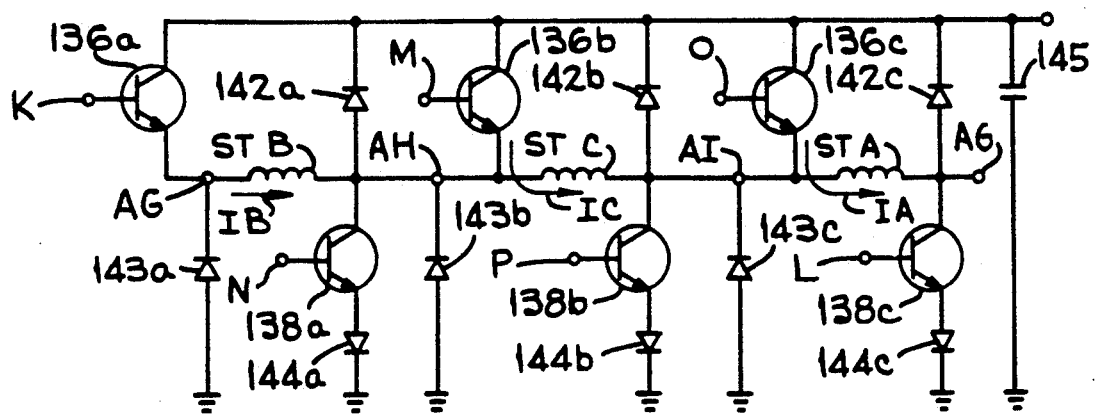

SYSTEM FOR POWERING, SPEED CONTROL, STEERING, AND BRAKING

This is a division of application Ser. No. 07/602,839, filed Oct. 24, 1990 now U.S. Pat. No. 5,162,707.

BACKGROUND OF THE INVENTION

This invention pertains to a system for powering and steering vehicles, and more particularly, to a system for using electrical propulsion to power, steer and brake heavy vehicles for precise control at all vehicle speeds.

The present invention is useful with tracked and other power vehicles to provide higher agility in the form of greater acceleration, higher speeds on slopes, better control over forward speed in turns, better fuel efficiency and a flexible drive train arrangement. Electric drives in combat vehicles allow major components, such as the engine, to be place anywhere in the vehicle without mechanical connections between the engine and the drive wheels or gears, and allow weight to be reduced. The same power used for the propulsion system can also be used to charge the weapon and armor system storage devices. The electrical energy storage can provide extended silent watch, silent-run ability and emergency get-home capability in the event of damage to the vehicle engine system.

SUMMARY OF THE INVENTION

The present invention comprises circuitry for powering and steering vehicles by providing individual controlled power to a pair of vehicle tracks in response to a speed command and a steering command.

A first electric motor provides a controlled amount of power and speed to a first vehicle track in response to the combination of a speed command signal, a steering command signal and a first track speed signal. A second electric motor provides a controlled amount of power and speed to a second vehicle track in response to the combination of the speed command signal, the steering command signal and a second track speed signal. When a track speed is greater than the combination of the steering command signal and the speed command signal, the electric motor provides braking of the corresponding vehicle track by returning power to a common dc bus. The same circuitry can be used with non-tracked vehicles by providing power to individual vehicle wheels. (The sum of electric motor speed errors control operation of an engine which drives an alternator that provides power to the common dc bus.)

BRIEF DESCRIPTION OF THE DRAWINGS

FIG. 1 is a block diagram of an electric-drive vehicle propulsion system of the present invention having totally electrical regenerative steering and braking.

FIG. 2 is a block diagram of an electric circuit for controlling engine speed motor power output, alternator output voltage, vehicle braking and for powering and steering a first side of a vehicle. Another electric circuit containing a duplicate of a portion of FIG. 2 provides power and steering for a second side of the vehicle.

FIGS. 3A, 3B comprise an electronic circuit showing details of a portion of FIG. 2.

FIGS. 4A, 4B, 5A, 5B are electronic circuits each showing details of other portions of the circuit of FIG. 2.

FIG. 6 shows details of circuits which provide power to drive the electric motors and to power the vehicle.

FIG. 7 illustrates voltage waveforms used in controlling electric current applied to the electric motors which power the vehicle.

FIG. 8 is an enlarged view of a portion of FIG. 6 showing operation of the circuit used to drive one of the electric motors.

DESCRIPTION OF THE PREFERRED EMBODIMENT

An induction motor propulsion system 10 of FIG. 1 includes an electronic control 11 which provides control signals to an engine 12, an alternator 15 and a power electronics assembly 16 in response to signals from a driver's station 17. Three-phase ac power generated by alternator 15 is converted to dc power by a rectifier 21, coupled to a dc power bus 22 and used to power a pair of track motors 23a, 23b under the control of a corresponding pair of power bridges 24a, 24b. A braking circuit 28 selectively couples bus 22 to a braking resistor 29 to providing electronic braking for a vehicle (not shown) in which system 10 can be used. A fan control 30 selectively couples bus 22 to an engine cooling fan 31. When the vehicle is turning sharply the inside track motor 23a or 23b acts as a generator and returns power to bus 22 for use by the outside track motor. This provides regenerative steering of the vehicle for effective control without the need for mechanical brakes or clutches. When driver's station 17 asks for a slower vehicle speed, motors 23a, 23b both return power to bus 22 thereby causing braking circuit 28 to dump power from bus 22 into braking resistor 29 and effectively braking motors 23a, 23b. System 10 is able to develop 1000 hp for the two 500 hp motors 23a, 23b and to propel a 50 ton vehicle. The electronic control 11 receives forward command, steer command, and forward—reverse command signals from the driver's station 17 (FIG. 1). In addition, motor speed and direction signals, engine throttle position and dc bus voltage signals are received.

An induction motor propulsion control system 39 of FIG. 2 includes a speed control P1 and a steering control P2 to provide control signals for powering and steering a vehicle. A switch 42 having a forward contact Fr and a reverse contact Sv provides signals for operating a vehicle in forward and reverse directions. A dc reference voltage on an input terminal T1 and a vehicle speed voltage on an input terminal T2 are combined in an adder A1 to provide a voltage to speed control P1. The setting of speed control P1 provides a speed command signal which an adder A2 combines with the vehicle speed voltage on terminal T2 to provide a difference signal to an input lead 43 of a circuit 44. This signal on input lead 43 represents the difference between the actual vehicle speed and the desired vehicle speed and is used to increase or decrease the speed of motors 23a, 23b (FIG. 1) until the actual vehicle speed is equal to the desired speed. A speed sensor 45 (FIG. 2) having an associated rotating gear 48 develops a vehicle speed signal proportional to the speed of a track sprocket 49 and of a vehicle track 50. A terminal T2a from speed sensor 45 is connected to terminal T2 to provide the vehicle speed voltage for adder A2.

The difference signal on input lead 43 is also used to set engine speed. Circuit 44 produces a voltage that is proportional to speed error. Adder A3 sums desired engine idle speed with vehicle speed. Circuit 54 produces a desired engine speed that is the output of adder A3 or the output of circuit 44 whichever is greater. An engine speed circuit 57 provides an actual engine speed signal to adder A4 which develops a difference speed signal which is amplified by an amplifier 61 and applied to a circuit 64. A throttle position potentiometer P3 provides a throttle position signal which is determined by the position of an engine throttle 62 of engine 12. The throttle position signal is amplified by circuits 63 and applied to circuit 64 also. The output of circuit 64 is amplified by A5. The output of A5 is coupled to a pulse width modulator (PWM) 69 which develops a voltage which causes a small servo motor 70 to position throttle 62 for desired engine speed. The rotation of motor 70 is opposed by a spring 74 connected to throttle 62.

The input signal to PWM 69 (FIG. 2) is also coupled through a circuit 75 and combined with the signal from amplifier 44 by an adder A6 to produce a difference signal. The signals fed back through circuits 54, 56 and 76 provide automatic compensation so the circuit of FIG. 2 automatically provides the amount of power needed by motor 23a. The speed of engine 12 is controlled so alternator 15 provides the needed power to dc power bus 22 and bridge 24a couples the power to motor 23a. Circuit 75 produces a negative input to adder A6 when the engine speed drops below the desired speed. The difference signal from adder A6 is added to the vehicle speed signal from terminal T2 in an adder A7. The output signal from adder A7 and a steer input signal from control P2 provides a right speed command signal to a circuit 76 for operating a motor to propel track 50 on the right side of a vehicle. The signal from adder A7 and the signal from control P2 cause an adder A19 to produce a left speed command signal to a circuit (not shown) for operating a motor on the left side of a vehicle. A circuit (not shown) for operating the left track motor 23b (FIG. 1) is similar to the circuit of FIG. 2 for operating the right motor 23a.

A motor rotor Ro for the right motor (FIG. 2) rotates track sprocket 49 and gear 48 of speed sensor 45. The speed signal from speed sensor 45 is converted to an actual-track-speed signal by a frequency-to-voltage converter 80 and applied to an adder A9 which subtracts the track speed signal from the right speed command signal. A clamp 81 limits the amount of signal applied to an adder A10 to limit the acceleration of motor rotor Ro. When the signal from adder A9 has a positive value a voltage from a voltage-to-frequency converter 82 has an output frequency higher than the rotational velocity of rotor Ro, so power bridge 24a provides a three phase rotating field voltage to motor stators StA, StB, StC which results in a positive slip causing rotor speed to increase. When the signal from adder A9 has a negative value, converter 82 provides an output frequency lower than the rotational velocity of rotor Ro and causes a braking action on the rotor.

The track speed signal from converter 80 (FIG. 2) and the signal from adder A9 are applied to an adder A11 which develops a difference signal. An ammeter 86 measures the electrical current to one leg of the stator windings StA—StC and a current-to-voltage converter 87 provide a stator voltage signal to an adder A12. The stator voltage signal is subtracted from the difference signal at adder A12 and applied to a pulse width modulator (PWM) 88. PWM 88 controls the amount of electrical current which power bridge 24a applies to stators StA, StB, StC. The current for bridge 24a is generated by alternator 15 and converted to dc by rectifier 21 which has its output connected to bus 22. Thus, PWM 88 controls the width of electrical current pulses applied to the stators by power bridge 24a, and converter 82 controls the frequency of these current pulses. Details of these current pulses are shown in waveforms K, M, O of FIG. 7. The width of the current pulses determine the power developed by motor 24a, and the frequency of the pulses determine motor speed.

The amplitude of the dc voltage on bus 22 is determined by the speed of engine 12 (FIG. 2) and alternator 15 and by the amount of electrical current applied to an alternator field 92 by a control circuit 93. The vehicle speed signal on input terminal T2 is amplified by a circuit 94 and applied to an adder A13 which adds the amplified speed signal to a fixed voltage to obtain a desired bus voltage signal. The actual bus voltage from bus 22 is subtracted from the desired bus voltage by an adder A14 and applied to a pulse width modulator (PWM) 95. PWM 95 develops pulses which are proportional to the input voltage, with each volt of input providing a pulse width equal to five percent of the time duration. That is, one volt produces a five percent pulse width signal, two volts produce a ten percent pulse width signal, etc. Pulses from PWM 95 cause a transistor Q2 to be conductive so an electrical current flows from bus 22 through transistor Q2 and alternator field 92 causing alternator 15 to provide an output to rectifier 21 which raises the bus voltage. When the bus voltage is higher than the desired bus voltage signal to PWM 95, Q2 is rendered nonconductive and the alternator field current drops to zero. A 150 volt input to a terminal T4 causes adder A13 to provide a minimum of 150 volts to adder A14. A dc voltage applied to a terminal T6 provides a voltage to alternator field 92 during start-up periods when the bus voltage is very low.

Braking circuit 28 (FIG. 2) controls the input voltage to a transistor Q1 to limit the upper voltage value on bus 22 and provide electric braking of a vehicle. A minimum of 150 volts from adder A13 plus 25 volts from an input terminal T5 cause an adder A15 to develop a minimum of 175 volts. The output of adder A15 is subtracted from the voltage on bus 22 by an adder A16 and the difference is coupled to a pulse width modulator (PWM) 96. PWM 96 operates similarly to PWM 95 and provides a five percent pulse width output for each volt of input. The pulses from PWM 96 render a transistor Q1 conductive and cause an electrical current to flow from bus 22 through transistor Q1 and resistor 29 to lower the bus voltage. During vehicle braking rotor Ro rotates faster than the field applied to the stators causing the stators to provide power to bus 22 through power bridge 24a thus raising the voltage on bus 22. When the voltage on bus 22 reaches a voltage 20 volts above the voltage from adder A16, PWM 96 supplies a continuous voltage which keeps transistor Q1 turned on thereby connecting resistor 29 to bus 22. The electric track motors 23a, 23b (FIGS. 1. 2) generate power which is dissipated in load resistor 29 to provide dynamic braking.

Details of a circuit corresponding to the block diagram of FIG. 2 are disclosed in FIGS. 4A, 4B, 5A, 5B, 6A, 6B and 7. FIGS. 3A and 3B are drawn so that when they are placed side-by-side the leads from the right side of FIG. 3A extend to the leads from the left side of FIG. 3B to form a control circuit for the right track motor. FIGS. 4A, 4B are also drawn so leads extend from the right side of FIG. 4A to the left side of FIG. 4B when they are placed side-by-side. FIGS. 5A, 5B are similarly drawn. Leads from other portions of these drawings have identifying letters which indicate where these leads are connected on other drawings. A voltage on terminal T2 (FIGS. 2, 5A) is proportional to the speed of a vehicle (not shown) which is controlled by the electronic circuit represented by FIG. 2. The voltage from terminal T2 plus a 4 volt drop across a zener diode Z1 (FIG. 5A) is applied to both ends of speed control P1, causing a speed command signal from P1 to change as vehicle speed changes. Amplifier A2 compares the speed command signal from P1 with the actual vehicle speed signal on terminal T2 and amplifies the difference. When the output of A2 has a positive value the voltage from A2 raises the voltage at a junction point 102. Amplifier A3 provides an engine speed signal equal to an idle speed plus a constant K times the vehicle speed signal from terminal T2. An actual commanded engine speed signal at junction point 102 is the larger of the two signals. Engine speed circuit 57 (FIG. 5A) comprises a frequency-to-voltage converter 58 which generates a voltage proportional to engine speed. Amplifier A4 is an inverting amplifier that produces a negative output proportional to the difference between the commanded engine speed and the actual engine speed. Amplifier 63 produces an output that is proportional to throttle position. A capacitor C10 couples a signal representing the rate of change of the opening of throttle 62 (FIG. 2), to a resistor R10. Resistors R10 and R11 form a summing junction at the input of amplifier A5. Amplifier A5 (FIG. 5B) amplifies the sum of the negative engine speed error and the rate of change of the throttle opening and drives a pulse width modulator amplifier 69. Amplifier 69 includes a PWM chip 101, and an N channel mosfet Q3 which drives servo motor 70 (FIG. 2) to position motor throttle 62. The pulse width from PWM 101 is 100% when the input voltage from a resistor R13 is below −0.6 volts, and the pulse width is 0% when the input voltage is above +4 volts. When the input voltage is between −0.6 and +4 the output varies in a linear manner between 100% and 0% pulse width.

Thus, the engine speed is set by the combination of vehicle speed error, which is the difference between the commanded vehicle speed and the actual vehicle speed. When the difference is positive, the engine speed is raised linearly from 2000 RPM to 5000 RPM. Throttle position is capacitively coupled to a summing junction to limit the rate of opening the throttle when a positive engine speed error occurs. This limiting of the rate of throttle opening allows the engine speed servo to operate at a much higher gain than without it. PWM 69 provides 100% pulse width for engine speed errors above 150 RPM.

The vehicle speed error from amplifier A2 (FIG. 5A) also provides an input signal to the track servo motors to control track speeds. The vehicle speed signal from terminal T2 and the vehicle speed error signal from amplifier A2 are summed at the input of an amplifier 100 (FIG. 5B) which provides a signal to amplifier A7 (FIG. 3A). The amplitude of the vehicle speed error signal from amplifier A2 (FIG. 5A) is limited by a pair of zener diodes 106, 107 to a value of 12 volts at the cathode of diode 106 when the speed error is 150 RPM or less. When the engine speed error is 900 RPM, the voltage at the cathode of diode 106 is reduced to a value of zero. Thus diodes 106, 107 limit the amount of power applied to the track motors 23a, 23b (FIG. 1) by reducing the vehicle speed error signal when the engine speed is 150 RPM or lower than the commanded engine speed.

The output of amplifier 100 (FIG. 5B) is amplified by an amplifier 108 and summed with a steer signal input at adder A8 (FIG. 3A) for the right track servo motor 23a (FIG. 1). The steer signal is inverted by an amplifier 109 (FIG. 3A) and summed with the output of amplifier 108 by an adder A9 (FIG. 4A). The combination of an amplifier 112, a diode 113 and a resistor 114 (FIG. 3A) form the adder A8 having an output signal equal to the positive value of the input signal and having a zero value of output signal when the input signal has a negative value. The voltage at the cathode of diode 113 is the commanded motor speed for the right track motor. The frequency-to-voltage converter 80 (FIG. 4B) produces a voltage at a set of junctions 118, 118a with the voltage proportional to right motor speed. Speed sensor 45 (FIGS. 2, 3A) develops a series of pulses used by converter 80 to develop the output voltage. Converter 80 includes a frequency-to-voltage chip 119 and an amplifier 120. One frequency-to-voltage chip 119 which can be used is the Model AD650 made by Intel Corporation, Santa Clara, Corporation. Amplifier 76 (FIG. 3A) amplifies the difference between the commanded motor speed and the actual right motor speed and sums the amplified difference with the actual right motor speed.

$$\text{The output of amplifier 76} = (V_c - V_s)\frac{R53}{R52} + V_s,$$

where $V_c$ is the commanded motor speed voltage; $V_s$ is the actual motor speed voltage, and R52 and R53 are the values of resistors R52 and R53. A clamping circuit 81 (FIG. 3A) comprising a pair of amplifiers 123, 124 limit the value of voltage at a junction 125 as a function of motor speed.

The upper limit of positive voltage at junction 125 is limited to a value of $$V_s\left(\frac{R73}{R73 + R72}\right) + .6 \text{ volts}.$$

For negative voltages the value is limited to $$V_s\left(\frac{R57}{R56 + R57}\right) - .6 \text{ V}$$

where R72, R73, R56, R57 are the value of these resistors at circuit 81.

A voltage-to-frequency converter 82 (FIG. 3B) has an input voltage applied to a resistor R75. The input voltage at R75 is $$(V125 - V_s) \times \frac{R74}{R74 + R55} + V_s.$$

The voltage at junction 125 is $$(\text{output of 76} - V_s) \times \frac{R55 + R74}{R55 + R74 + R54} + V_s$$

and the voltage is clamped to the values listed above. Substituting the output of circuit 76

$$V_{125} = \left[(V_c - V_s)\left(\frac{R53}{R52} + V_s\right) - V_s\right]\frac{R55 + R74}{R55 + R74 + R54}$$
$$+ V_s$$

$$= (V_c - V_s)\frac{R53}{R52} \times \frac{R55 + R74}{R55 + R74 + R54} + V_s$$

$$VR75 = \left[(V_c - V_s)\frac{R53}{R52} \times \right.$$

$$\left.\frac{R55 + R74}{R55 + R74 + R54} + V_s - V_s\right]\frac{R74}{R74 + R55} + V_s$$

$$VR75 = (V_c - V_s)\frac{R53}{R52} \times$$

$$\frac{R55 + R75}{R55 + R74 + R54} \times \frac{R74}{R74 + R55} + V_s.$$

When the commanded motor speed $V_c$ and the actual motor speed $V_s$ are equal, $VR75 = V_s$ and voltage-to-frequency converter 82 (FIG. 3B) produces an output frequency equal to the input frequency at frequency-to-voltage converter 119. The output of converter 82 provides a clock to a programmable logic array U12. Programmable logic array U12 provides output signals to a plurality of N channel mosfets Q5-Q10 which generate three-phase waveforms to control electrical current from power bridge 24a (FIGS. 1, 2, 6) to windings StA, StB, StC of right track motor 23a. One programmable logic array U12 which can be used in the present circuit is the Model P22V10 made by Intel Corporation, Santa Clara, Calif.

The three-phase waveforms cause the induction track motor to rotate clockwise or counterclockwise as commanded on input pin #2 by a debouncer circuit 129 (FIG. 3B). Debouncer circuit 129 receives forward and reverse command signals from a forward/reverse switch 130 (FIG. 3A) and receives motor speed signals from speed sensor 45. Actual motor direction from speed sensor 45 is transmitted to pin 3 of array U12 by debouncer circuit 129. Programmable logic array U12 steps through one electrical cycle for every 24 clock pulses on input pin #1. The motor speed feedback gear 48 (FIG. 2) has 48 teeth and the motor is a 4-pole motor, so two electrical cycles are required for each revolution. When $V_c - V_s$ is equal to zero, the output motor frequency is equal to the motor synchronous frequency. When $V_c$ is greater than $V_s$, the output motor frequency is raised linearly above the synchronous frequency until it is clamped by amplifier 123 and diode CR10 (FIG. 3A) in clamping circuit 81. When $V_c$ is less than the synchronous frequency, the output frequency is lowered linearly below the synchronous frequency until it is clamped by amplifier 124 and diode CR9.

The output of the speed error amplifier 76 (FIG. 3A) and motor speed $V_s$ are used to command a motor current at the cathodes of diodes CR14 and CR15. Amplifier U16B produces a voltage at the cathode of diode CR14 having a value of:

$$V_cR14 = (V_c - V_s)\frac{R53}{R52} \times \left(1 + \frac{R94}{R111}\right) + V_s.$$

Diode CR14 limits the output to positive values only.

Amplifier U16C produces at voltage at the cathode of diode CR15 having a value of:

$$V_cR15 = V_s + (V_s - V_c)\frac{R53}{R52} \times \frac{R113}{R124}$$

Diode CR15 limits the output to positive values only. The voltage at the cathodes of diodes CR14 and CR15 is the commanded motor current. It is summed with motor current feedback at the junction of resistors R95 and R86. Inverting amplifier U16A produces a negative going output voltage which is proportional to the difference between the commanded current and the actual current. The voltage at the output of U16A is:

$$V_cR16 = \frac{R114}{R114 + R115} \times 15\,V \times \frac{R97}{\frac{R86 \times R95}{R86 + R95}} -$$

$$[V_cR14 - CR15 + VU14 - 14]\frac{R97}{\frac{R86 \times R95}{R86 + R95}}$$

$$V_cR16 = \frac{R97}{\frac{R86 \times R95}{R86 + R95}} \times$$

$$\left[\frac{R114}{R114 + R115} \times 15\,V - (V_cR14 - CR15 + VU14 - 14)\right]$$

The output voltage of amplifier U16A is initially set at +4 volts by $$\frac{R114}{R114 + R115} \times 15\,V \times \frac{R97}{\frac{R86 \times R95}{R86 + R95}}$$

swings down to a $-0.6$ and is clamped by diode CR16. Pulse width modulator 88 (FIG. 3B) includes circuit U17 which produces a 100% duty cycle with an input of $-0.6$ v from amplifier U16A and produces a 0% duty cycle with an input of 4 volts and above. Resistor R126 and capacitor C50 set the output pulse frequency of U17 at 3 KHz which is coupled to the programmable logic array U12.

Programmable logic array (PLA) U12 (FIG. 3B) provides a plurality of pulse modulated signals to a plurality of mosfets Q5, Q7, Q9 which provide voltage waveforms K, M, O (FIG. 7) respectively to terminals K, M, O (FIG. 6) of right track bridge 24a. Signals from U12 provides a plurality of motor frequency pulses to a plurality of mosfets Q6, Q8, Q10 which provide voltage waveforms L, N, P (FIG. 7) to terminals L, N, P of right track bridge 24a (FIG. 6). Terminals AG, AH, AI (FIGS. 2, 6) are connected to stator windings StA, StB, stc (FIG. 2) of right track motor 23a (FIG. 1). Terminals AGI, AH' and AI' (FIG. 6) are for connection to motor 23b (FIG. 1) in the same manner that terminals AG, AH, AI are connected to motor 23a (FIG. 2). A plurality of terminals AJ—EJ and AL—EL are connected to a plurality of current sensors 86a, 86b, 86c (FIGS. 5A, 6) which provide current values to an amplifier U14A in current-to-voltage converter 87. Amplifier U14A sums and amplifies the currents and couples the sum to inverting amplifier U14D (FIG. 3A), and to a power bridge shutoff circuit 132 (FIG. 3B).

Shutoff circuit 132 includes a timer U4 and a transistor Q17 (FIG. 3B). When the voltage at the base of transistor Q17 exceeds 0.6 volts transistor Q17 is rendered conductive and triggers timer U4. The output voltage on pin 3 of timer U4 stays high as long as Q17 conducts and for a subsequent period of time which is determined by the values of resistor R22 and capacitor C12. Output pin 3 of timer U4 is connected to pin 5 of PLA U12 of FIG. 3B and to pin 5 of a PLA U12A of FIG. 4B. The voltages on output leads 10-11, 13-16 of PLA U12, U12A are turned off when the current limit input to U12, 12A is high.

Amplifier U19A (FIG. 3A) is a level detector with positive feedback. When $V_s$ from amplifier 120 is low the output of U19A is high and the noninverting input is biased at a value of:

$$\frac{R169}{R169 + (R168 \, \& \, R143 \text{ in parallel})} \times 15 \text{ v}$$

When $V_s$ rises above this bias value the output goes low and the noninverting input is biased at a value of:

$$\frac{R169}{R169 + (R168 \, \& \, R143 \text{ in parallel})} \times \left[ \frac{R143}{R168 + R143} \times 30 - 15 \text{ v} \right]$$

When $V_s$ drops below this value the output goes high.

The output of amplifier U19A is connected to PLA U12 through resistors R144, R145 which converts the 15 volt signal to a 5 volt signal. PLA U12 is programmed to inhibit the drive motor from changing directions when the voltage on input pin 4 is low.

Amplifier U19B (FIG. 3A) is a voltage follower that sums the right motor speed (FIG. 6A) and the left motor speed (FIG. 4A). The output of U19B (FIG. 3A) is amplified by amplifier A13 (FIG. 5A) and the output of A13 is summed with a reference voltage created by resistors R181 and R131. The voltage at junction point 131 is the commanded dc bus voltage. Amplifier A15 produces an output voltage proportional to engine speed and clamps the commanded dc bus voltage through diode CRI01. Commanded dc bus voltage is controlled as a function of the sum of the motor speeds and is limited by engine speed.

The actual bus voltage on input lead J (FIGS. 3B, 5B) is coupled through resistor R165 to inverting amplifier A14 (FIG. 5A). When the actual bus voltage is less than the commanded bus voltage at junction point 131 the output voltage of A14 decreases proportionally. When the output of A14 is −0.6 volts PWM amplifier provides 100% pulse width to the alternator field 92 (FIG. 2) on line X (FIGS. 2, 5B). When the output voltage from A14 is 4 volts the pulse width to alternator field 92 is zero. When the bus voltage to non-inverting amplifier A16 rises above the commanded voltage at junction point 131 the output of A16 goes low. When the output of A16 reaches −0.6 volts PWM, 96 provides full pulse width to input lead W (FIGS. 5B, 6) of braking circuit 28 so a braking current flows through resistor 29 (FIGS. 2, 6) to provide brake of a vehicle.

The circuit of FIGS. 3A, 3B and portions of FIGS. 5A, 5B, 6 control operation of right track motor 23a (FIG. 1). In a similar manner, the circuits of FIGS. 4A, 4B and portions of 5A, 5B, 6 control the operation of left track motor 23b (FIG. 1). The circuits of FIGS. 4A, 4B which function similarly to the circuits of FIGS. 3A, 3B have been given similar part numbers. For example, PWM 88 of FIG. 3B and PWM 88a of FIG. 4B operate in a similar manner to control power to motors 23a and 23b respectively.

Power bridge circuits 24a, 24b (FIGS. 1, 6) provide pulses of current which cause motors 23a, 23b to develop a very high torque at low engine speeds while using a small amount of electrical power from rectifier 21. A portion of FIG. 6 has been redrawn as FIG. 8 to illustrate how this is done using the signals K-P from FIG. 3B applied to the corresponding signal input terminals of FIGS. 6 and 8. The shapes of these signal waveforms K-P are illustrated in FIG. 7. The same terminal AG is shown in two locations in FIG. 8 in order to simplify the drawing.

At a time $t_1$ (FIG. 7) signal K renders transistor 136a (FIGS. 6, 8) conductive and signal N renders transistor 138a conductive. A current IB flows from common dc bus 22 through transistor 136a, stator winding StB, transistor 138a and diode 144a to ground. At time $t_2$ the inductance of winding StB keeps IB flowing through transistor 138a, and diodes 144a, 143a with only a small change in current amplitude as shown in waveform IB of FIG. 7. At time $t_4$ current IB again flows in the same current path as at time $t_1$. Current IB provides power to operate motor 23a.

At time $t_7$ (FIG. 7) voltage waveform N cuts off current through transistor 138a, but voltage waveform P holds transistor 138b conductive and voltage waveform m renders transistor 136b conductive. A current IC flows from dc bus 22 through transistor 136b, stator winding StC, transistor 138b and diode 144b to ground. The inductance of winding StB also causes current to flow from bus 22 through transistor 136a, winding StB and diode 142a to bus 22.

At time $t_{13}$ voltage waveform O (FIG. 7) renders transistor 136c (FIG. 8) conductive and voltage waveform L keeps transistor 138c conductive. A current IA flows from bus 22 through transistor 136c, winding StA, transistor 138c and diode 144c to ground. At time $t_{14}$ the inductance of winding StA keeps IA flowing through transistor 138c, diode 144c and through diode 143c with only a small change in current amplitude. The width of the pulses of waveforms K, M and O is very short compared to the time between pulses so the average value of current from bus 22 and capacitor 145 is much lower than the value of the currents IA, IB, IC through stator windings StA, StB, Stc. As a result, motors 23a, 23b provide an extremely high torque with a very small amount of electrical power from bus 22. For example, at low motor speeds the average current IB (FIG. 7) can be approximately 1000 amps while bus 22 supplies approximately 10 amp of current. The waveforms K, M, O are not drawn to scale as the pulses are actually very narrow compared to the time between pulses when motors 23a, 23b operate at speeds between 0 and 10 rpm.

Although the best mode contemplated for carrying out the present invention has been herein shown and described, it will be apparent that modification and variation may be made without departing from what is regarded to be the subject matter of the invention.

What is claimed is:

1. An electrical propulsion system for controlling motor speed and power over a wide range of motor speeds, said system comprising:
   an induction motor for having a rotor and a plurality of stator windings;
   means for developing a signal proportional to rotor speed;

means for providing a desired rotor speed signal;
means for comparing said rotor speed signal and said desired speed signal and developing a difference signal;
means for using said difference signal to provide pulses of current to said stator windings to set a speed of said induction motor to a desired value;

an engine;
an alternator coupled to said engine and to said induction motor; and
means for sensing said difference signal to control the speed of said engine and to control an amount of current supplied by said alternator to said motor.

* * * * *